US008966284B2

(12) United States Patent
Holtzman et al.

(10) Patent No.: US 8,966,284 B2
(45) Date of Patent: Feb. 24, 2015

(54) HARDWARE DRIVER INTEGRITY CHECK OF MEMORY CARD CONTROLLER FIRMWARE

(75) Inventors: Michael Holtzman, Cupertino, CA (US); Ron Barzilai, Kfar-Vradim (IL); Reuven Elhamias, Kfar-Vradim (IL); Niv Cohen, Kibutz Shamir (IL)

(73) Assignee: SanDisk Technologies Inc., Plano, TX (US)

( * ) Notice: Subject to any disclaimer, the term of this patent is extended or adjusted under 35 U.S.C. 154(b) by 820 days.

(21) Appl. No.: 11/285,600

(22) Filed: Nov. 21, 2005

(65) Prior Publication Data

US 2007/0061897 A1    Mar. 15, 2007

Related U.S. Application Data

(60) Provisional application No. 60/717,347, filed on Sep. 14, 2005.

(51) Int. Cl.
*G06F 11/30*    (2006.01)
*G06F 21/57*    (2013.01)

(52) U.S. Cl.
CPC ............ *G06F 21/57* (2013.01); *G06F 21/575* (2013.01)
USPC .......... 713/193; 713/189; 713/190; 713/191; 713/192; 713/194

(58) Field of Classification Search
CPC ....................................................... G06F 21/86
USPC ................................................. 713/189–194
See application file for complete search history.

(56) References Cited

U.S. PATENT DOCUMENTS

| | | | |
|---|---|---|---|
| 4,549,896 A | 10/1985 | Streicher et al. | 65/135 |
| 4,590,552 A | 5/1986 | Guttag et al. | 364/200 |
| 4,697,072 A | 9/1987 | Kawana | |
| 4,713,753 A | 12/1987 | Boebert et al. | 364/200 |
| 4,780,905 A | 10/1988 | Cruts et al. | 380/44 |
| 4,797,853 A | 1/1989 | Savage et al. | 364/900 |
| 4,907,268 A | 3/1990 | Bosen et al. | 380/4 |
| 5,006,823 A | 4/1991 | Baril et al. | 333/164 |
| 5,065,429 A | 11/1991 | Lang | 380/25 |

(Continued)

FOREIGN PATENT DOCUMENTS

| | | |
|---|---|---|
| CN | 1655121 | 8/2005 |
| EP | 0 087 143 A1 | 8/1983 |

(Continued)

OTHER PUBLICATIONS

Suh et al. "Efficient Memory Integrity Verification and Encryption for Secure Processors" Proceedings of the 36th International Symposium on Microarchitecture 2003, pp. 1-12.*

(Continued)

*Primary Examiner* — Christopher Brown
*Assistant Examiner* — Roderick Tolentino
(74) *Attorney, Agent, or Firm* — Brinks Gilson & Lione

(57) ABSTRACT

A memory system comprises an encryption engine implemented in the hardware of a controller. In starting up the memory system, a boot strapping mechanism is implemented wherein a first portion of firmware when executed pulls in another portion of firmware to be executed. The hardware of the encryption engine is used to verify the integrity of at least the first portion of the firmware. Therefore, only the firmware that is intended to run the system will be executed.

14 Claims, 8 Drawing Sheets

(56) References Cited

U.S. PATENT DOCUMENTS

| | | | |
|---|---|---|---|
| 5,129,074 A | 7/1992 | Kikuchi et al. | |
| 5,235,641 A | 8/1993 | Nozawa et al. | 380/21 |
| 5,268,870 A | 12/1993 | Harari | 365/218 |
| 5,293,424 A | 3/1994 | Holtey et al. | 380/23 |
| 5,311,595 A | 5/1994 | Bjerrum et al. | 380/25 |
| 5,319,765 A | 6/1994 | Kimura | 395/425 |
| 5,327,563 A | 7/1994 | Singh | 395/700 |
| 5,404,485 A | 4/1995 | Ban | 395/425 |
| 5,438,575 A | 8/1995 | Bertrand | 371/48 |
| 5,442,704 A | 8/1995 | Holtey et al. | 380/23 |
| 5,455,862 A | 10/1995 | Hoskinson | 380/21 |
| 5,477,039 A | 12/1995 | Lisimaque et al. | 235/380 |
| 5,509,120 A | 4/1996 | Merkin et al. | |
| 5,530,862 A | 6/1996 | Wadsworth et al. | |
| 5,596,738 A | 1/1997 | Pope | |
| 5,606,660 A | 2/1997 | Estakhri et al. | 395/183.14 |
| 5,629,513 A | 5/1997 | Geronimi et al. | 235/492 |
| 5,710,639 A | 1/1998 | Kuznicki et al. | 358/426 |
| 5,825,882 A | 10/1998 | Kowalski et al. | 380/25 |
| 5,857,020 A | 1/1999 | Peterson, Jr. | 380/4 |
| 5,860,082 A | 1/1999 | Smith et al. | 711/103 |
| RE36,181 E | 4/1999 | Koopman, Jr. et al. | 380/23 |
| 5,917,909 A | 6/1999 | Lamla | 705/67 |
| 5,933,854 A | 8/1999 | Yoshimura | 711/164 |
| 5,943,423 A | 8/1999 | Muftic | 380/25 |
| 5,956,405 A | 9/1999 | Yuval | 380/29 |
| 5,987,134 A | 11/1999 | Shin et al. | 380/25 |
| 5,995,623 A | 11/1999 | Kawano et al. | |
| 5,995,965 A | 11/1999 | Experton | 707/10 |
| 6,009,026 A * | 12/1999 | Tamlyn et al. | 365/201 |
| 6,026,402 A | 2/2000 | Vossen et al. | 707/9 |
| 6,028,933 A | 2/2000 | Heer et al. | 380/9 |
| 6,073,234 A | 6/2000 | Kigo et al. | 713/161 |
| 6,101,588 A | 8/2000 | Farley et al. | 711/168 |
| 6,148,354 A | 11/2000 | Ban et al. | 710/102 |
| 6,154,544 A | 11/2000 | Farris et al. | 380/262 |
| 6,158,004 A | 12/2000 | Mason et al. | 713/200 |
| 6,181,252 B1 | 1/2001 | Nakano | 340/825.31 |
| 6,182,229 B1 | 1/2001 | Nielsen | 713/202 |
| 6,230,223 B1 | 5/2001 | Olarig | 710/126 |
| 6,230,233 B1 | 5/2001 | Lofgren et al. | 711/103 |
| 6,236,280 B1 | 5/2001 | Allee | |
| 6,243,816 B1 | 6/2001 | Fang et al. | 713/202 |
| 6,253,328 B1 | 6/2001 | Smith, Jr. | 713/202 |
| 6,353,888 B1 | 3/2002 | Kakehi et al. | 713/168 |
| 6,356,941 B1 | 3/2002 | Cohen | 709/219 |
| 6,370,251 B1 | 4/2002 | Hardy et al. | 380/286 |
| 6,371,377 B2 | 4/2002 | Asoh et al. | 235/487 |
| 6,385,729 B1 | 5/2002 | DiGiorgio et al. | 713/201 |
| 6,389,542 B1 | 5/2002 | Flyntz | 713/201 |
| 6,393,565 B1 | 5/2002 | Lockhart et al. | 713/172 |
| 6,422,460 B1 | 7/2002 | Boesch | 235/380 |
| 6,434,700 B1 | 8/2002 | Alonso et al. | 713/169 |
| 6,445,794 B1 | 9/2002 | Shefi | 380/46 |
| 6,457,126 B1 | 9/2002 | Nakamura et al. | 713/166 |
| 6,522,655 B1 | 2/2003 | Laiho | 370/410 |
| 6,571,335 B1 | 5/2003 | O'Donnel et al. | |
| 6,577,734 B1 | 6/2003 | Etzel et al. | 380/277 |
| 6,615,347 B1 | 9/2003 | de Silva et al. | 713/156 |
| 6,615,352 B2 | 9/2003 | Terao et al. | 713/184 |
| 6,629,192 B1 | 9/2003 | Schaefer et al. | 711/103 |
| 6,671,808 B1 | 12/2003 | Abbott et al. | 713/200 |
| 6,678,741 B1 | 1/2004 | Northcutt et al. | |
| 6,678,828 B1 | 1/2004 | Pham et al. | 713/201 |
| 6,742,117 B1 | 5/2004 | Hikita et al. | 713/172 |
| 6,754,765 B1 | 6/2004 | Chang et al. | 711/103 |
| 6,763,399 B2 | 7/2004 | Margalit et al. | 710/13 |
| 6,783,078 B1 | 8/2004 | Leaming | |
| 6,788,575 B2 | 9/2004 | Kozakai et al. | |
| 6,804,786 B1 | 10/2004 | Chamley et al. | 713/201 |
| 6,810,123 B2 | 10/2004 | Farris et al. | 380/262 |
| 6,829,676 B2 | 12/2004 | Maeda et al. | 711/103 |
| 6,832,731 B2 | 12/2004 | Kaneko | 235/492 |
| 6,845,908 B2 | 1/2005 | Morita et al. | 235/382 |
| 6,848,045 B2 | 1/2005 | Long et al. | 713/4 |
| 6,865,555 B2 | 3/2005 | Novak | 705/59 |
| 6,880,079 B2 | 4/2005 | Kefford et al. | 713/155 |
| 6,892,304 B1 | 5/2005 | Galsso et al. | |
| 6,901,499 B2 | 5/2005 | Aasheim et al. | |
| 6,907,522 B2 | 6/2005 | Morais et al. | |
| 6,912,633 B2 | 6/2005 | De Jong | |
| 6,928,547 B2 | 8/2005 | Brown et al. | 713/186 |
| 7,023,996 B2 | 4/2006 | Stephenson et al. | |
| 7,058,818 B2 | 6/2006 | Dariel | 713/189 |
| 7,062,616 B2 | 6/2006 | Sadhasivan et al. | 711/153 |
| 7,093,299 B1 | 8/2006 | Kamijo et al. | |
| 7,095,585 B2 | 8/2006 | Wagner et al. | |
| 7,120,729 B2 | 10/2006 | Gonzalez et al. | 711/103 |
| 7,246,266 B2 | 7/2007 | Sneed et al. | |
| 7,299,358 B2 | 11/2007 | Chateau et al. | |
| 7,380,275 B2 | 5/2008 | Srinivasan et al. | |
| 7,412,053 B1 | 8/2008 | Lyle | |
| 2001/0019614 A1 | 9/2001 | Madoukh | 380/277 |
| 2001/0025355 A1 | 9/2001 | Palm et al. | 714/726 |
| 2001/0037435 A1 | 11/2001 | Van Doren | |
| 2001/0047335 A1 | 11/2001 | Arndt et al. | |
| 2002/0029343 A1 | 3/2002 | Kurita | 713/185 |
| 2002/0034303 A1 | 3/2002 | Farris et al. | 380/270 |
| 2002/0065730 A1 | 5/2002 | Nii | 705/26 |
| 2002/0099666 A1 | 7/2002 | Dryer et al. | 705/71 |
| 2002/0141588 A1 | 10/2002 | Rollins | 380/277 |
| 2002/0145632 A1 | 10/2002 | Shmueli et al. | 345/835 |
| 2002/0174337 A1 | 11/2002 | Aihara | 713/172 |
| 2002/0176575 A1 | 11/2002 | Qawami et al. | 380/201 |
| 2002/0178370 A1 | 11/2002 | Gurevich et al. | 713/189 |
| 2002/0186842 A1 | 12/2002 | Sabet-Sharghi et al. | 380/200 |
| 2002/0191794 A1 | 12/2002 | Farris et al. | 380/260 |
| 2003/0018889 A1 | 1/2003 | Burnett et al. | 713/153 |
| 2003/0028514 A1 | 2/2003 | Lord et al. | 707/1 |
| 2003/0028797 A1 | 2/2003 | Long et al. | 713/194 |
| 2003/0041242 A1 | 2/2003 | Patel | |
| 2003/0061504 A1 | 3/2003 | Sprigg et al. | 713/200 |
| 2003/0065935 A1* | 4/2003 | Neufeld | 713/200 |
| 2003/0070083 A1 | 4/2003 | Nessler | 713/193 |
| 2003/0101327 A1 | 5/2003 | Beck | |
| 2003/0110169 A1 | 6/2003 | Zuili et al. | 707/9 |
| 2003/0120938 A1 | 6/2003 | Mullor | 713/190 |
| 2003/0131210 A1 | 7/2003 | Mueller | 711/200 |
| 2003/0135739 A1 | 7/2003 | Talton, Sr. | 713/185 |
| 2003/0135844 A1* | 7/2003 | Yellin et al. | 717/126 |
| 2003/0149886 A1 | 8/2003 | Ito et al. | 713/193 |
| 2003/0156473 A1 | 8/2003 | Sinclair et al. | 365/200 |
| 2003/0177319 A1 | 9/2003 | De Jong | |
| 2003/0191955 A1* | 10/2003 | Wagner et al. | 713/191 |
| 2003/0204726 A1 | 10/2003 | Kefford et al. | 713/171 |
| 2003/0212894 A1 | 11/2003 | Buck et al. | 713/184 |
| 2003/0221117 A1 | 11/2003 | Teglia | |
| 2004/0024917 A1 | 2/2004 | Kennedy et al. | |
| 2004/0025010 A1 | 2/2004 | Azema et al. | |
| 2004/0025011 A1 | 2/2004 | Azema et al. | |
| 2004/0025027 A1 | 2/2004 | Balard et al. | |
| 2004/0025035 A1 | 2/2004 | Balard et al. | |
| 2004/0025036 A1 | 2/2004 | Balard et al. | |
| 2004/0044625 A1 | 3/2004 | Sakamura et al. | 705/41 |
| 2004/0054907 A1 | 3/2004 | Chateau et al. | |
| 2004/0059916 A1 | 3/2004 | Katayama | |
| 2004/0063495 A1 | 4/2004 | LeMay et al. | |
| 2004/0066936 A1 | 4/2004 | Farris et al. | |
| 2004/0083335 A1 | 4/2004 | Gonzalez et al. | 711/103 |
| 2004/0083370 A1 | 4/2004 | de Jong | 713/182 |
| 2004/0093592 A1 | 5/2004 | Rao | |
| 2004/0098585 A1 | 5/2004 | Grove et al. | 713/168 |
| 2004/0103288 A1 | 5/2004 | Ziv et al. | 713/185 |
| 2004/0103347 A1 | 5/2004 | Sneed et al. | |
| 2004/0117653 A1 | 6/2004 | Shapira et al. | 713/201 |
| 2004/0123127 A1 | 6/2004 | Teicher et al. | 713/193 |
| 2004/0128523 A1 | 7/2004 | Fujioka | 713/189 |
| 2004/0132437 A1 | 7/2004 | Ohmori et al. | 455/414.1 |
| 2004/0139021 A1 | 7/2004 | Reed et al. | 705/50 |
| 2004/0148536 A1 | 7/2004 | Zimmer et al. | |
| 2004/0153642 A1 | 8/2004 | Plotkin et al. | 713/150 |
| 2004/0168081 A1 | 8/2004 | Ladas et al. | 713/201 |
| 2004/0186994 A1 | 9/2004 | Herbert et al. | 713/164 |
| 2004/0193925 A1 | 9/2004 | Safriel | 713/202 |

(56) References Cited

U.S. PATENT DOCUMENTS

| | | |
|---|---|---|
| 2004/0230963 A1 | 11/2004 | Rothman et al. |
| 2004/0264254 A1 | 12/2004 | Eggleston |
| 2004/0268339 A1* | 12/2004 | Van Someren et al. ....... 717/172 |
| 2005/0010758 A1 | 1/2005 | Landrock et al. ............. 713/156 |
| 2005/0010783 A1 | 1/2005 | Libin et al. .................... 713/182 |
| 2005/0015588 A1 | 1/2005 | Lin et al. ....................... 713/159 |
| 2005/0033968 A1 | 2/2005 | Dupouy et al. ............... 713/183 |
| 2005/0049931 A1 | 3/2005 | Wisnudel et al. ............... 705/26 |
| 2005/0050330 A1 | 3/2005 | Agam et al. ................... 713/172 |
| 2005/0060561 A1* | 3/2005 | Pearson et al. ............... 713/194 |
| 2005/0091496 A1 | 4/2005 | Hyser |
| 2005/0114620 A1 | 5/2005 | Justen ........................... 711/170 |
| 2005/0120205 A1 | 6/2005 | Umezawa et al. ............ 713/156 |
| 2005/0137997 A1 | 6/2005 | Bussert et al. |
| 2005/0144430 A1 | 6/2005 | Yamamoto et al. |
| 2005/0149924 A1* | 7/2005 | Komarla et al. .............. 717/176 |
| 2005/0160217 A1 | 7/2005 | Gonzalez et al. .................. 711/6 |
| 2005/0185493 A1 | 8/2005 | Fujioka et al. |
| 2005/0190393 A1 | 9/2005 | Bledsoe et al. |
| 2005/0190599 A1 | 9/2005 | Eggleston et al. |
| 2005/0193161 A1 | 9/2005 | Lee et al. |
| 2005/0193206 A1 | 9/2005 | Kunisa et al. |
| 2006/0048228 A1* | 3/2006 | Takemori et al. ................ 726/22 |
| 2006/0143600 A1* | 6/2006 | Cottrell et al. ................ 717/168 |
| 2006/0176068 A1 | 8/2006 | Holtzman et al. ............. 324/765 |
| 2006/0177064 A1 | 8/2006 | Holtzman et al. ............. 380/277 |
| 2006/0242151 A1 | 10/2006 | Jogand-Coulomb et al. ..... 707/9 |
| 2007/0005991 A1* | 1/2007 | Kober et al. ................... 713/193 |
| 2007/0011724 A1 | 1/2007 | Gonzalez et al. .................. 726/4 |
| 2007/0016941 A1 | 1/2007 | Gonzalez |
| 2007/0061570 A1 | 3/2007 | Holtzman et al. ............. 713/168 |
| 2007/0061581 A1 | 3/2007 | Holtzman et al. ............. 713/176 |
| 2007/0061597 A1 | 3/2007 | Holtzman et al. ............. 713/193 |
| 2007/0061897 A1 | 3/2007 | Holtzman et al. ............... 726/34 |

FOREIGN PATENT DOCUMENTS

| | | |
|---|---|---|
| EP | 0 461 983 A1 | 12/1991 |
| EP | 0 461 983 B1 | 4/1995 |
| EP | 0 919 904 A2 | 8/1998 |
| EP | 1 004 992 A3 | 5/2000 |
| EP | 1 074 906 A1 | 8/2000 |
| EP | 1 209 657 A1 | 8/2000 |
| EP | 1 273 996 A2 | 1/2003 |
| EP | 1 351 151 A2 | 10/2003 |
| EP | 1 467 312 A1 | 4/2004 |
| EP | 1 429 224 A1 | 6/2004 |
| EP | 1 487 170 A2 | 6/2004 |
| EP | 849657 A1 | 6/2004 |
| EP | 1 457 922 A3 | 9/2004 |
| EP | 1 496 419 A1 | 1/2005 |
| GB | 2 391 082 A | 7/2002 |
| JP | H03-009427 | 1/1991 |
| JP | 2000-196589 | 7/2000 |
| JP | 2002-536757 | 10/2002 |
| JP | 2002288453 | 10/2002 |
| JP | 2003-051821 | 2/2003 |
| JP | 2004-013905 A | 1/2004 |
| JP | 2004-280287 | 10/2004 |
| JP | 2006-502482 | 1/2006 |
| JP | 2006-522988 | 10/2006 |
| JP | 2007-535015 | 11/2007 |
| TW | 589569 | 6/2004 |
| TW | I231899 | 5/2005 |
| WO | WO 99/47989 | 9/1999 |
| WO | WO 99/64996 | 12/1999 |
| WO | WO 00/10283 | 2/2000 |
| WO | WO 00/48063 | 8/2000 |
| WO | WO 01/24012 | 4/2001 |
| WO | WO 02/25415 | 3/2002 |
| WO | WO 02/048846 A2 | 6/2002 |
| WO | WO 02/103495 A1 | 12/2002 |
| WO | WO 03/081544 A2 | 10/2003 |
| WO | WO 03/096287 | 11/2003 |
| WO | WO 03/096287 A1 | 11/2003 |
| WO | WO 2004/031942 | 4/2004 |
| WO | WO 2004/040578 A2 | 5/2004 |
| WO | WO 2004/040586 A1 | 5/2004 |
| WO | WO 2004/086228 A1 | 10/2004 |
| WO | WO 2004/092886 A2 | 10/2004 |
| WO | WO 2004/112036 A1 | 12/2004 |
| WO | WO 2005/001653 A2 | 1/2005 |
| WO | WO 2005/010686 A2 | 2/2005 |
| WO | WO 2005/010688 A2 | 2/2005 |
| WO | WO 2005/013125 A1 | 2/2005 |
| WO | WO 2005/019974 | 3/2005 |
| WO | WO 2005/066773 | 7/2005 |
| WO | WO 2006/086232 | 8/2006 |
| WO | 2007/008540 | 1/2007 |
| WO | 2007/033321 | 3/2007 |

OTHER PUBLICATIONS

Williams et al. "Optimal Parameter Selection for Efficient Memory Integrity Verification Using Merkle Hash Trees" Proceedings of the Third IEEE International Symposium on Network Computing and Applications (NCA'04) 383-388.*

U.S. Appl. No. 60/717,163, "Secure Yet Flexible System Architecture for Secure Devices with Flash Mass Storage Memory," filed Sep. 14, 2005, Micky Holtzman.

U.S. Appl. No. 60/717,164, "Secure Yet Flexible System Architecture for Secure Devices with Flash Mass Storage Memory," filed Sep. 14, 2005, Holtzman, et al.

U.S. Appl. No. 60/717,347, "Hardware Driver Integrity Check of Memory Card Controller Firmware," filed Sep. 14, 2005, Holtzman, et al.

Akagi, A., "SD Format Verification," Matsushita Technical Journal Apr. 2002 vol. 49, No. 2 pp. 11-14 ISSN: 1343-9529.

Allard, J.J., "Dynamic Memory Array Card Burn in and High Speed Functional Card Testing," 1981 International Test Conference, Testing in the 1980's pp. 244-248.

Barsness, A.R. et al.,"ECC Memory Card with Built in Diagnostic Aids and Multiple Usage," IBM Technical Disclosure Bulletin, Apr. 1982 vol. 24, No. 11B pp. 6173-6174.

Black, John, "Comments to NIST concerning AES Modes of Operations: A Suggestion for Handling Arbitrary-Length Messages with the CBC MAC," University of Nevada, Reno, Phillip Rogaway, University of California at Davis http://csrc.nist.gov/CryptoToolkit/modes/proposedmodes/xcbc-mac/xcbc-mac-spec.pdf, 3 pages.

Communication Relating to the Results of the Partial International Search for International Application No. PCT/US2006/026241 mailed Dec. 18, 2006, 3 pages.

Deepakumara, Janaka, et al., "Performance Comparison of Message Authentication Code (MAC) Algorithms for the Internet Protocol Security (IPSEC) Electrical and Computer Engineering," Memorial University of Newfoundland, St. John's, NL, Canada, A1B3S7 http://www.engr.mun.ca/~howard/PAPERS/necec 2003b.pdf, 7 pages.

Dialog Search, Oct. 6, 2004 (15 pages).

Dialog Search, Oct. 3, 2005 (31 pages).

Discretix Technologies Ltd. "Secure Flash™ System Specification", Version 1.05, Jul. 15, 2004, Netanya, Israel (36 pages).

Engelbrecht, R., et al., ByMedCard-An Electronic Patient Record with Chip Card Functionality, Health Cards '97 Fourth International Congress pp. 313-317.

Frankel, Sheila, "RFC 3566—The AES-XCBC-MAC-96 Algorithm and Its Use With IPsec," NIST-National Institute of Standards and Technology, 820 West Diamond Ave., Room 677, Gaithersburg, MD 20899, http://www.faqs.org/rfcs/rfc3566.html, 10 pages.

Gemplus, Employee Smart Badge, One Integrated and Secure Smart Badge to Manage All Access, 2 pages.

Guibert, H.; Gamache, A., Optical Memory Card Applicability for Implementing a Portable Medical Record, Medical Informatics Jul.-Sep. 1993 vol. 18, No. 3 pp. 271-278 ISSN: 0307-7640.

Haller, et al., "A One-Time Password System," IETF Standard-Working-Draft, Internet Engineering Task Force, IETF, No. 1, Mar. 24, 1997, XP015024796, pp. 1-8.

Hoornaert, "Vasco Data Security Enables Secure Communications Over the Internet," IS Audit & Control Journal, vol. IV, 1999, 3 pages.

(56) References Cited

OTHER PUBLICATIONS

Identification Cards—Contactless Integrated Circuit(s) Cards—Proximity Cards—Part 1: Physical Characteristics, ISO_IEC_14443-1_2000_PDF, 10 pages.
Identification Cards—Contactless Integrated Circuit(s) Cards—Proximity Cards—Part 2: Radio Frequency Power and Signal Interface, ISO_IEC_14443-2_2001_PDF, 18 pages.
iKey 1000, Workstation Security and Secure Remote Access, SafeNet, 2004, 2 pages.
iKey 2032, Personal USB Authentication and Encryption Token, SafeNet, 2005, 2 pages.
ISA/EPO, "Invitation to Pay Additional Fees", mailed on Jan. 26, 2007 in corresponding Int'l. App. No. PCT/US2006/035839, 2 pages.
ISA/EPO, "Invitation to Pay Additional Fees", mailed on Dec. 18, 2006 in corresponding Int'l. App. No. PCT/US2006/026241, 7 pages.
ISA/EPO, "Notification of Transmittal of the International Search Report and the Written Opinion of the International Searching Authority, or the Declaration," mailed on Feb. 8, 2007 in corresponding Int'l. App. No. PCT/US2006/026241, 9 pages.
ISA/EPO, "Notification of Transmittal of the International Search Report and the Written Opinion of the International Searching Authority, or the Declaration," mailed on Mar. 29, 2007 in corresponding Int'l. App. No. PCT/US2006/035840, 6 pages.
ISA/EPO, "Notification of Transmittal of the International Search Report and the Written Opinion of the International Searching Authority, or the Declaration," mailed on May 25, 2007 in corresponding Int'l. App. No. PCT/US2006/035839, 9 pages.
ISA/EPO, "Written Opinion of the International Searching Authority," mailed on Feb. 8, 2007 in corresponding Int'l. App. No. PCT/US2006/026241, 15 pages.
ISA/EPO, "Written Opinion of the International Searching Authority," mailed on Mar. 29, 2007 in corresponding Int'l. App. No. PCT/US2006/035840, 8 pages.
ISA/EPO, "Written Opinion of the International Searching Authority," mailed on Sep. 13, 2006 in corresponding Int'l. App. No. PCT/US2006/035839, 12 pages.
Johnson, D., "Bus Emulation Drives Production Testing," Test & Measurement World Feb. 1995 vol. 15, No. 2 pp. 41-42, 44, 46, 48 ISSN: 0744-1657.
Lee, et al., "Modified Token-Update Scheme for Site Authentication, School of Computer Science and Engineering," Inha University, Incheon, 402-751, Korea, 6 pages.
Nystrom RSA Security M: "The Protected One-Time Password Protocol (EAP-POTP)," IETF Standard-Working-Draft, Internet Engineering Task Force, IETF, CH No. 2, Jun. 30, 2005, XP015040287.
O.J. Horak, "Means and Measures for Data Security," Armed Forces Data Processing Agency, Stifgasse 2a, A-1070 Wien, Austria, IFAC SAFECOMP '89, Vienna, Austria, 1989, 9 pages.
Open Specifications Integrate One-Time Passwords with Enterprise Applications, RSA Security, Feb. 2005, 10 pages.
Orlowski, Andrew, "Everything You Ever Wanted to Know About CPRM, But ZDNet Wouldn't Tell You . . . ," The Register.co.UK, Jan. 10, 2001, 6 pages.
Pinkas, Benny, "Efficient State Updates for Key Management," STAR Lab, Intertrust Technologies, Princeton, NJ, DRM 2001, LNCS 2320 pp. 40-56, 2002.
Renesas, X-Mobile Card, Digital Rights Management, Authentication and Secure Storage for Mobile Devices, Providing Remote Access and Secure Storage Solutions for IT, Advanced Solutions Group, 2005, 4 pages.
RSA Security Inc.: "A CryptoAPI Profile for One-Time Password Tokens V1.0 Draft 2" One-Time Password Specifications (OTPS), Jun. 27, 2005, XP002416270.
RSA Security Inc.: "OTP-WSS-Token: Web Services Security One-Time-Password (OTP) Token Profile, Version 1-0d3", One-Time Password Specifications (OTPS), Jul. 6, 2005, XP002416269.
RSA Security Inc.: "PKCS#11 Mechanisms for One-Time Password Tokens V1.0 5th Draft", One-Time Password Specifications, Jun. 27, 2005, XP002415773.
RSA Security, "Federated Identity Management and Return on Investment," White Paper, 2004-2005, 12 pages.
RSA Security, "Federated Identity Manager, A Technical Overview," Technology Backgrounder, 2005, 16 pages.
RSA Specification, "Cryptographic Token Key Initialization Protocol, V1.0 Draft 3," RSA Security, Jun. 14, 2005, 29 pages.
Rubin, "Independent One-Time Passwords," USENIX Association, Proceedings of the Fifth USENIX UNIX Security Symposium, Jun. 5-7, 1995, 13 pages.
Rubin, "Independent One-Time Passwords," USENIX, A Quarterly dedicated to the analysis and understanding of advanced computing systems, vol. 9, No. 1, Winter 1996, 15 pages.
SafeNet AXIS, "Strong Authentication and Single Sign-On," AXIS Instant Logical & Physical Access Security, 2005, 2 pages.
SanDisk Corporation "BE2 Architecture", Revision 1.1, Jun. 9, 2003 (21 pages).
SanDisk Corporation I, "CryptoFlash Integration in BE2", Revision 1.21, Oct. 19, 2004, (34 pages).
SanDisk Israel Discloser #SDK0570 "Flash Memory Card with in Stream data Encryption/Decryption", (4 pages).
Secure Business-to-Business Single Sign-On (B2B SSO) Based on Federated Identity Management, RSA Security, 2004-2005, 6 pages.
Seitz, et al., "Key Management for Encrypted Data Storage in Distributed Systems," Proceedings of the Second IEEE International Security in Storage Workshop (SISW'03), 11 pages.
ST Microelectronics: "Trusted Platform Module (TPM)"; May 2004; XP-002345888; 5 pages.
Tsuchida, S., "Test and Repair of Non-Volatile Commodity and Embedded Memories," Proceedings International Test Conference 2002 (Cat. No. 02CH37382) p. 1223 ISBN: 0 7803 7542 4.
U.S. Appl. No. 11/317,862, "Secure Memory Card with Life Cycle Phases", filed Dec. 22, 2005, Holtzman et al.
VeriSign, "Extending Managed PKI Services to Smart Cards for Greater Convenience and Security," 2001, 14 pages.
VeriSign, "Trusted Federated Identity Solution Architecture," 2004, 16 pages.
Weippl, Edgar, "An Approach to Role-Based Access Control for Digital Content," Software Competence Center Hagenberg Hauptstr. 99 A4232 Hagenberg, Austria, 2001, 5 pages.
Wu, D.M., Doney, R., "A Universal Self-Test Design for Chip, Card and System," Proceedings 1992 IEEE International Workshop on Defect and Fault Tolerance in VLSI Systems (Cat. No. 92TH0481-2) pp. 305-314 ISBN: 0 8186 2837 5.
Yang, et al., "CD-Rom Versus Web-Access to External Databases-Experiences and Insights," Rider University Libraries, pp. 193-200.
ISA/EPO, "Invitation to Pay Additional Fees," mailed on Mar. 8, 2007 in corresponding Int'l. App. No. PCT/US2006/003876, 7 pages.
ISA/EPO, "Notification of Transmittal of the International Search Report and the Written Opinion of the International Searching Authority, or the Declaration," mailed on Aug. 17, 2007 in corresponding Int'l. App. No. PCT/US2006/003876, 19 pages.
Federal Information Processing Standards Publications 180-2, "Secure Hash Standard," Aug. 1, 2002, pp. 1-75, http://csrc.nist.gov/publication/fips/fips 180-2.pdf.
Communication pursuant to Article 94(3) EPC corresponding to European Patent Application No. 06 786 402.5 dated Jul. 30, 2008 (2 pages).
European Examination Report mailed Feb. 9, 2009 in Application No. 06814655.4 [P408EP].
USPTO Office Action issued Nov. 19, 2008 in related U.S. Appl. No. 11/053,273 (21 pp.).
USPTO Office Action issued Apr. 30, 2008 in related U.S. Appl. No. 11/284,623, 18 pp. . (P408).
Notice of Allowance issued Jan. 15, 2009 in related U.S. Appl. No. 11/284,623 [P408].
USPTO Non-Final Office Action mailed Feb. 21, 2008 in related U.S. Appl. No. 11/317,341 (38 pages).
USPTO Final Office Action mailed Nov. 28, 2008 in related U.S. Appl. No. 11/317,341 (26 pages).

(56) References Cited

OTHER PUBLICATIONS

USPTO Non-Final Office Action mailed Dec. 14, 2007 in related U.S. Appl. No. 11/317,339 (6 pages).
USPTO Non-Final Office Action mailed Aug. 1, 2008 in related U.S. Appl. No. 11/317,339 (31 pages).
European Search Report for European Patent Application Serial No. 06814655.4, dated Feb. 9, 2009, 3 pages.
Office Action for Chinese Patent Application Serial No. 200680033798.3, dated Sep. 9, 2011, 9 pages.
Office Action for Chinese Patent Application Serial No. 201110059311.1, dated Jan. 18, 2012, 7 pages.
Interrogatory Statement for Japanese Patent Application Serial No. 2008-531324 (Appeal No. 2011-024471), dated Mar. 13, 2012, 6 pages.
Notification for Reasons for Refusal for Corresponding JP Patent App. No. 2008-531324, 13 pages, Jan. 25, 2011.
Search Report for European Patent Application Serial No. EP 11001172.3, dated Jul. 11, 2011, 6 pages.
Office Action for European Patent Application Serial No. 06814655.4, dated Jul. 14, 2011, 6 pages.
Office Action for Japanese Patent Application Serial No. JP 2008-531324, dated Jul. 12, 2011, 3 pages.
Office Action for Chinese Patent Application Serial No. 200680033798.3, Apr. 25, 2012, 28 pages.
Office Action for Chinese Patent Application Serial No. 201110059311.1, dated Oct. 31, 2012, 5 pages.
Office Action for Chinese Patent Application Serial No. 201110059311.1, dated Feb. 5, 2013, 8 pages.
Office Action for Japanese Patent Application Serial No. 2011-137416, dated Apr. 16, 2013, 7 pages.
Office Action for Taiwanese Patent Application Serial No. 095134073, dated Mar. 25, 2013, 12 pages.

\* cited by examiner

US 8,966,284 B2

HARDWARE DRIVER INTEGRITY CHECK OF MEMORY CARD CONTROLLER FIRMWARE

CROSS REFERENCE TO RELATED APPLICATIONS

This application is related and claims priority to Provisional Application No. 60/717,347, filed Sep. 14, 2005 entitled "Hardware Driver Integrity Check of Memory Card Controller Firmware" to Micky Holtzman et al.

This application is also related to application Ser. No. 11/284,623 (now U.S. Pat. No. 7,536,540) entitled "Method of Hardware Driver Integrity Check of Memory Card Controller Firmware" to Micky Holtzman et al.; application Ser. No. 11/053,273 entitled "Secure Memory Card with Life Cycle Phases" to Micky Holtzman et al.; Provisional Application No. 60/717,163 entitled "Secure Yet Flexible System Architecture For Secure Devices With Flash Mass Storage Memory" to Micky Holtzman et al.; and Provisional Application No. 60/717,164 entitled "Secure Yet Flexible System Architecture For Secure Devices With Flash Mass Storage Memory" to Micky Holtzman et al. All of the aforementioned applications are hereby incorporated by this reference in their entireties.

FIELD OF THE INVENTION

The invention generally relates to memory cards with secure content and encryption of that content, and in particular relates to verifying the integrity of the firmware that runs secure memory cards.

BACKGROUND OF THE INVENTION

It is crucial to be able to verify the functionality of commercially available memory cards before they leave the factory, and to ensure that the cards are secure from hackers once they leave the factory. With the advent of digital rights management and the spread of protected content such as music and movies etc. . . . there is a need to ensure that the contents of the card cannot be freely copied. One way a hacker may attempt to do this is to alter or even replace the firmware that runs the memory card in order to be able to pirate the contents of the card. Thus it is essential to provide a system that ensures both the integrity and the reliability of the firmware running on the card at all times.

SUMMARY OF INVENTION

Verifying the integrity of the firmware is an important aspect of running a secure and reliable memory card. The present invention verifies the integrity of firmware that runs a memory card, universal serial bus (USB) flash drive, or other memory system. The integrity of the firmware is verified before it is executed. This prevents the execution of firmware that is not the factory firmware from being executed. This is particularly important because the factory firmware comprises security mechanisms including encryption algorithms that are meant to protect content from being freely copied. The present invention when implemented in a memory card prevents the card from running non-factory firmware or altered factory firmware that may allow copying of secure content. Thus a hacker cannot "trick" the card into running the wrong firmware. The verification process can also be used to verify the integrity of any stored data.

One aspect of the present invention involves a method for starting operation of a memory storage device, comprising providing firmware in a mass storage unit of the device, passing the firmware though an encryption engine, calculating hash values for the firmware with said encryption engine, comparing the calculated hash values with stored hash values, and executing the firmware if the computed hash values match the stored hash values.

Another aspect of the present invention involves a mass storage device comprising flash memory, read only memory, a first set of instructions that control data storage operations of the mass storage device, the first set stored in the flash memory, a second set of instructions that shadows the first set of instructions from the flash to an executable random access memory, the second set residing in the read only memory. An encryption engine is implemented in the hardware circuitry of the mass storage device and is capable of encrypting and decrypting data to be stored in and read from the flash memory. The encryption engine is operable to verify the integrity of the first set of instructions.

Yet another aspect of the present invention involves another method for starting operation of a memory storage device. The method comprises providing firmware in a mass storage unit of the device and executing a first set of instructions in a read only memory that copy the firmware from the mass storage unit to a random access memory. It also comprises verifying the integrity of the booting firmware using an encryption engine, and after the integrity is verified, executing the firmware from the random access memory with a microprocessor.

Additional aspects, advantages and features of the present invention are included in the following description of exemplary examples thereof, which description should be taken in conjunction with the accompanying figures, and wherein like numerals are used to describe the same feature throughout the figures, unless otherwise indicated. All patents, patent applications, articles and other publications referenced herein are hereby incorporated herein by this reference in their entirety for all purposes.

BRIEF DESCRIPTION OF THE DRAWINGS

FIG. 3 is a schematic illustration of the boot loader 200a.

DETAILED DESCRIPTION OF THE PREFERRED EMBODIMENTS

Figure 1A:
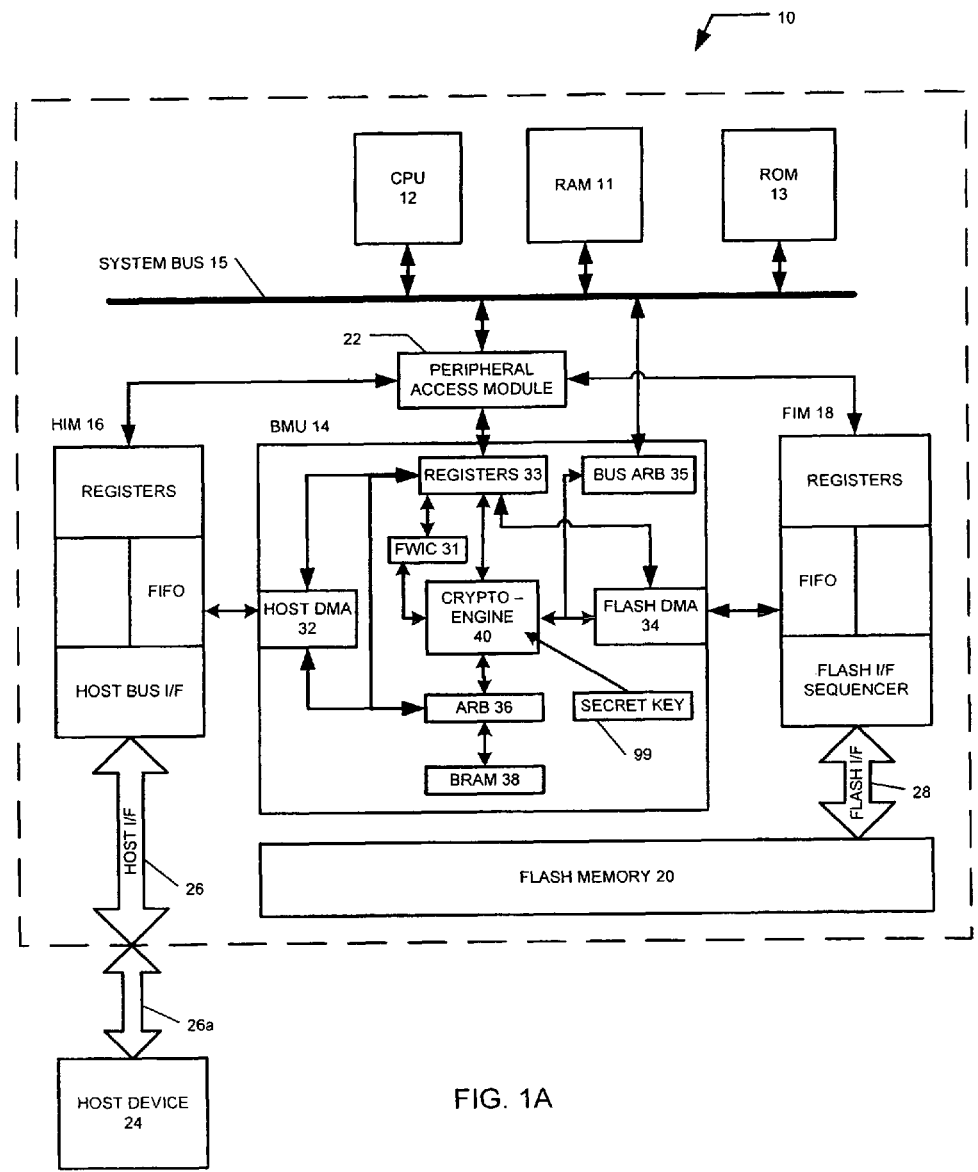
FIG. 1A is a schematic diagram of system 10 according to an embodiment of the present invention.

A Message Authentication Code ("MAC") is a number computed from some content (or message) that is used to prove the integrity of the content. Its purpose is to detect if the content has been altered. A Message Authentication Code is a hash computed from a message and some secret data. It is difficult to forge without knowing the secret data. The MAC is computed using an algorithm based on the DES or AES ciphers, which use a secret key. The MAC is then stored or sent with the message. The recipient recomputes the MAC using the same algorithm and secret key and compares it to the one that was stored or sent. If they are the same, it is assumed that the content or message has not been tampered with.

DES (Data Encryption Standard) is a NIST-standard cryptographic cipher that uses a 56-bit key. Adopted by the NIST in 1977, it was replaced by AES in 2001 as the official standard. DES is a symmetric block cipher that processes 64-bit blocks in four different modes of operation, with the electronic code book (ECB) being the most popular.

Triple DES increased security by adding several multiple-pass methods; for example, encrypting with one key, decrypting the results with a second key and encrypting it again with a third. However, the extra passes add considerable computing time to the process. DES is still used in applications that do not require the strongest security.

The Advanced Encryption Standard ("AES") is a NIST-standard cryptographic cipher that uses a block length of 128 bits and key lengths of 128, 192 or 256 bits. Officially replacing the Triple DES method in 2001, AES uses the Rijndael algorithm developed by Joan Daemen and Vincent Rijmen of Belgium. AES can be encrypted in one pass instead of three, and its key size is greater than Triple DES's 168 bits.

The Secure Hash Algorithm (SHA-1) produces a 20-byte output. NIST and NSA designed it for use with the Digital Signature Standard and it is widely used now. MD5 is another hash function that may be employed with the present invention. The aforementioned standards and various other algorithms are illustrative examples of hash functions and values that may be utilized with the present invention. Other types of hash functions and values available today and developed in the future can be utilized with the present invention.

Although the aforementioned standards and various other algorithms and/or standards are well known to those skilled in cryptography, the following publications are informative and are hereby incorporated by reference in their entireties: *RFC 3566—The AES-XCBC-MAC-96 Algorithm and Its Use With IPsec* by Sheila Frankel, NIST—National Institute of Standards and Technology, 820 West Diamond Ave, Room 677, Gaithersburg, Md. 20899, available at http://www.faqs.org/rfcs/rfc3566.html; *Performance Comparison of Message Authentication Code (MAC) Algorithms for the Internet Protocol Security (IPSEC)* by Janaka Deepakumara, Howard M. Heys and R. Venkatesan, Electrical and Computer Engineering, Memorial University of Newfoundland, St. John's, NL, Canada, A1B3S7 available at http://www.engr.mun.ca/~howard/PAPERS/necec_2003b.pdf; and *Comments to NIST concerning AES Modes of Operations: A Suggestion for Handling Arbitrary-Length Messages with the CBC MAC* by John Black, University of Nevada, Reno, Phillip Rogaway, University of California at Davis, available at http://csrc.nist.gov/CryptoToolkit/modes/proposedmodes/xcbc-mac/xcbc-mac-spec.pdf.

Memory System Architecture

An example memory system in which the various aspects of the present invention may be implemented is illustrated by the block diagram of FIG. 1A. As shown in FIG. 1A, the memory system 10 includes a central processing unit (CPU) or "controller" 12, a buffer management unit (BMU) 14, a host interface module (HIM) 16, flash interface module (FIM) 18, a flash memory 20 and a peripheral access module 22. Memory system 10 communicates with a host device 24 through a host interface bus 26 and port 26a. The flash memory 20, which may be of the NAND type, provides data storage for the host device 24. The software code for CPU 12 may also be stored in flash memory 20. FIM 18 connects to the flash memory 20 through a flash interface bus 28 and in some instances a port, which is not shown, if the flash memory 20 is a removable component. HIM 16 is suitable for connection to a host system like a digital camera, personal computer, personal digital assistant (PDA) and MP-3 players, cellular telephone or other digital devices. The peripheral access module 22 selects the appropriate controller module such as FIM, HIM, and BMU for communication with the CPU 12. In one embodiment, all of the components of system 10 within the dotted line box may be enclosed in a single unit such as in a memory card and preferably enclosed in the card.

The buffer management unit 14 comprises a host direct memory access unit (HDMA) 32, a flash direct memory access unit (FDMA) 34, an arbiter 36, a CPU bus arbiter 35, registers 33, firmware integrity circuitry (FWIC) 31, buffer random access memory (BRAM) 38, and a crypto engine 40 also referred to as encryption engine 40. The arbiter 36 is a shared bus arbiter so that only one master or initiator (which can be HDMA 32, FDMA 34 or CPU 12) can be active at any time and the slave or target is BRAM 38. The arbiter is responsible for channeling the appropriate initiator request to BRAM 38. HDMA 32 and FDMA 34 are responsible for data transported between HIM 16, FIM 18 and BRAM 38 or the RAM 11. The CPU bus arbiter 35 allows for direct data transfer from crypto engine 40 and flash DMA 34 to RAM 11 via system bus 15, which is used in certain situations such as for example when it is desired to bypass the crypto engine. The operation of the HDMA 32 and of the FDMA 34 are conventional and need not be described in detail herein. The BRAM 38 is used to store data passed between the host device 24 and flash memory 20. The HDMA 32 and FDMA 34 are responsible for transferring the data between HIM 16/FIM 18 and BRAM 38 or the CPU RAM 12a and for indicating sector completion.

When data from flash memory 20 is read by the host device 24, encrypted data in memory 20 is fetched through bus 28, FIM 18, FDMA 34, and crypto engine 40 where the encrypted data is decrypted and stored in BRAM 38. The decrypted data is then sent from BRAM 38, through HDMA 32, HIM 16, and bus 26 to the host device 24. The data fetched from BRAM 38 may again be encrypted by means of crypto engine 40 before it is passed to HDMA 32 so that the data sent to the host device 24 is again encrypted but by means of a different key and/or algorithm compared to those whereby the data stored in memory 20 is encrypted. Alternatively, rather than storing decrypted data in BRAM 38 in the above-described process, which data may become vulnerable to unauthorized access, the data from memory 20 may be decrypted and encrypted again by crypto engine 40 before it is sent to BRAM 38. The encrypted data in BRAM 38 is then sent to host device 24 as before. This illustrates the data stream during a reading process.

When data is written by host device 24 to memory 20, the direction of the data stream is reversed. For example if unencrypted data is sent by host device, through bus 26, HIM 16, HDMA 32 to crypto engine 40, such data may be encrypted by engine 40 before it is stored in BRAM 38. Alternatively, unencrypted data may be stored in BRAM 38. The data is then encrypted before it is sent to FDMA 34 on its way to memory 20.

Figure 1B:
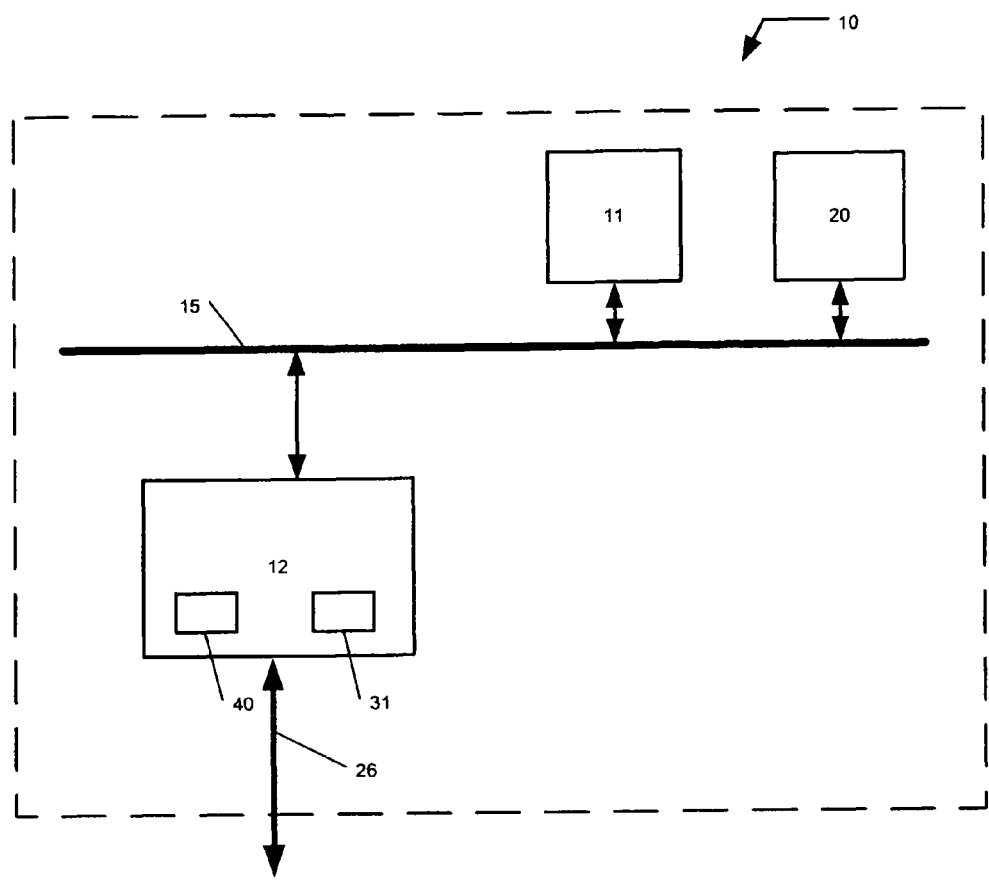
FIG. 1B is a schematic diagram of system 10 according to another embodiment of the present invention.

FIG. 1B illustrates another embodiment of system 10. In this preferred embodiment, the encryption engine 40 and firmware integrity circuit 31 are shown as part of controller 12. While it is preferred that these components are part of the controller, they may in certain embodiments not be integrated in the controller package. As described previously, RAM 11, flash memory 20, and controller 12 are all connected to system bus 15. Host interface bus 26 communicates with the host device 24 (not shown).

Firmware Integrity Verification

Figure 2:
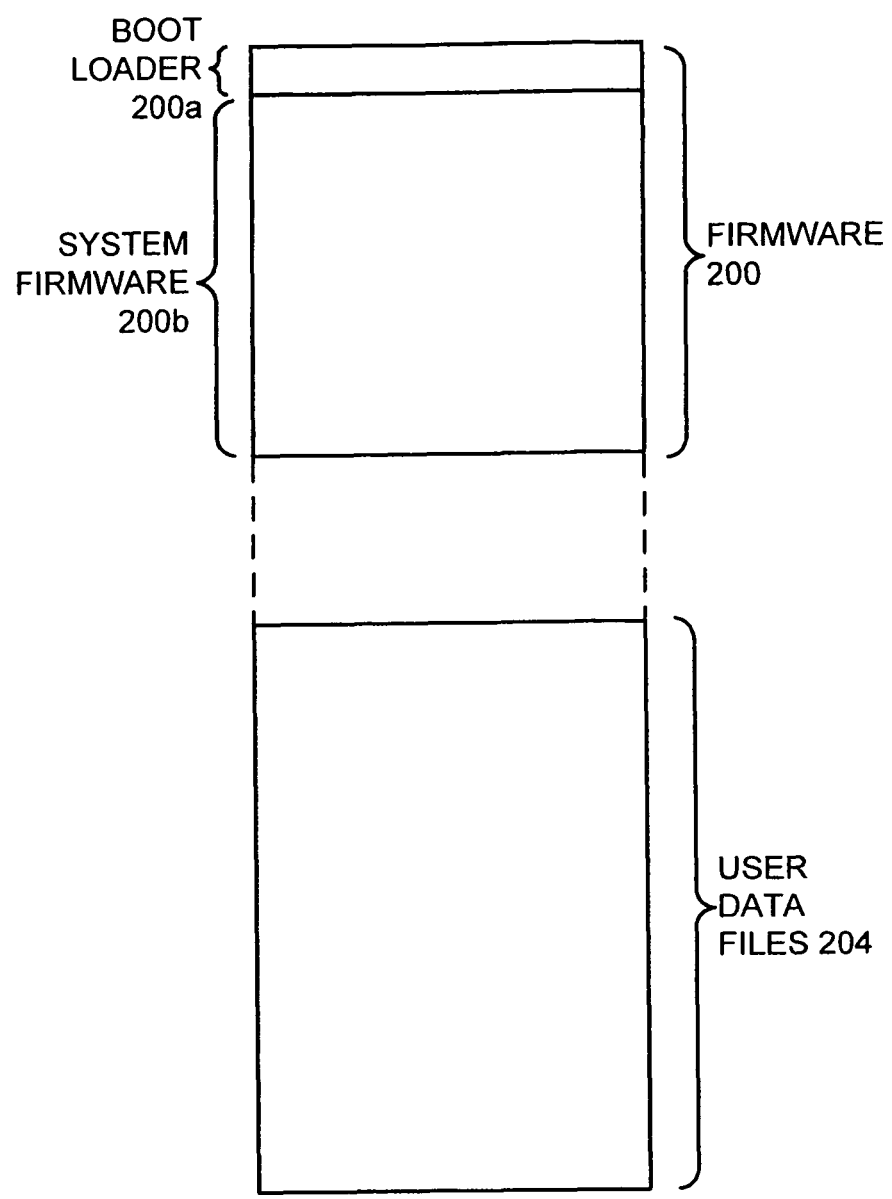
FIG. 2 is a diagram of the memory space of the flash memory seen in FIG. 1.

FIG. 2 is an illustration of the memory space of the flash memory that includes firmware 200 that runs system 10. The system firmware 200 comprises a boot loader (BLR) portion 200a that resides in flash memory 20 and is preferably not changeable, and system firmware 200b that resides in flash memory 20 and can be changed from time to time if necessary. Additional firmware may, in some embodiments, be present in ROM 13 that points to BLR portion 200a when it is executed directly or from a shadowed copy. The size of system firmware 200 is larger than the RAM module it is executed from, so the system firmware is divided into smaller portions referred to as overlays. Integrity verification of the BLR in the preferred embodiments utilizes a unique on the fly calculation where the expected values are stored in the data itself and a copy is temporarily stored in registers in a memory other than the flash memory 20. However, in certain embodiments, the technique used to verify the integrity of the BLR can be used to verify the integrity of the system firmware 200b. As mentioned previously, any hash value and hashing technique can be used, but MAC or SHA-1 values are currently preferable, and for simplicity the use of one or the other values will be described in a preferred embodiment. Generally, SHA-1 digests may alternatively be used in place of MAC values, and vice versa. The advantage of using MAC values is that they are associated with the hardware and the key of the hardware that created them. While SHA-1 values can be created for a given data set simply based upon the data itself, MAC values cannot be recreated without the key, and thus provide for more robust security. Specifically, because key 99 stored in the non volatile memory of encryption engine 40 must be used to create the MAC values, another processor cannot be utilized to recreate the MAC values. For example, a hacker cannot use another processor outside of the system to duplicate the firmware and the associated MAC values.

Also stored within the flash memory are various user data files 204. Various other programs and data that are not shown may be stored within the flash memory (not shown). These files may also be encrypted and the integrity verified in a similar or other fashion.

Figure 3:
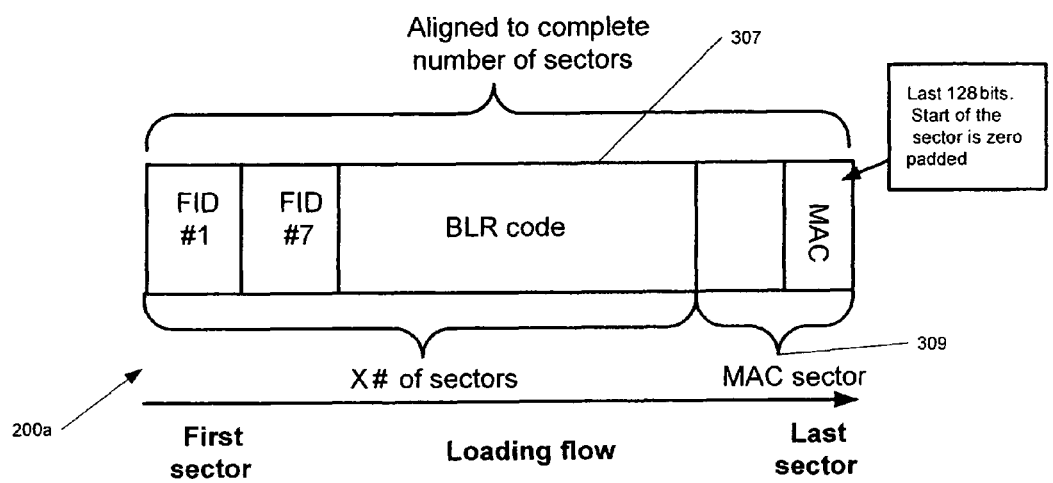

FIG. 3 illustrates the structure of some data sectors utilized by system 10 when in integrity check mode. The BLR, in particular, preferably utilizes this structure. The BLR code 307 itself is seen sandwiched between other data to make up the BLR 201a. Before the BLR code 307 is loaded, some configuration information is loaded. The configuration information is contained in the file identification (FID) sectors 1 and 7. The BLR code 307 is followed by the message authentication code sector 309. Within MAC sector 309 is the MAC value for the corresponding portion of the BLR code 307. This is the MAC value compared with the value calculated in FIG. 5, which is discussed in greater detail below. The MAC sector is zero padded to accommodate data of varying lengths so that the MAC always occupies the last 128 bits of the sector. The BLR code 307 is stored in flash memory 20 in the BLR portion 200a, and the configuration information may also be stored in flash memory 20.

Figure 4:
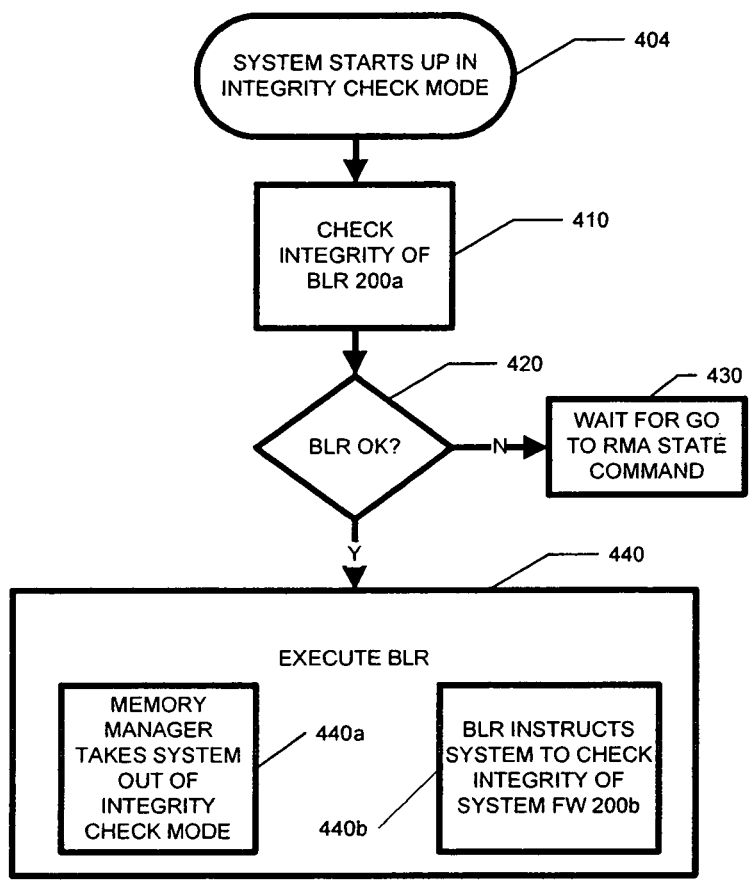
FIG. 4 is a flowchart of a portion of the booting process including a hardware based integrity check of the firmware.

FIG. 4 illustrates the processes of booting and running system 10 including verifying the integrity of the BLR code and the firmware. In particular, FIG. 4 includes a general overview of the integrity verification process as related to the BLR portion 200a of the firmware 200. In a preferred embodiment, verification of the system firmware 200b and application firmware is separate from verification of the BLR and takes place after that verification. It is noteworthy that the firmware is not loaded all at once by the BLR. The BLR loads a few modules only (the RAM resident firmware) and other modules (the overlays) are loaded on a per need basis and swapped into the same location(s) in the RAM.

When system 10 starts up it will start up in integrity check mode, as seen in step 404. Generally speaking, in this mode the crypto engine 40 is calculating the MAC value of all incoming data as discussed above and illustrated in detail in FIG. 5. This process ensures that the incoming data can be of variable length and stored in arbitrary locations in the NAND flash memory 20. In the preferred embodiment the data will be read in the same order it was written and the last block read will contain the MAC. The result of the MAC comparison is available for the firmware to check at any time. The individual steps seen in FIG. 4 will now be described.

Figure 5:
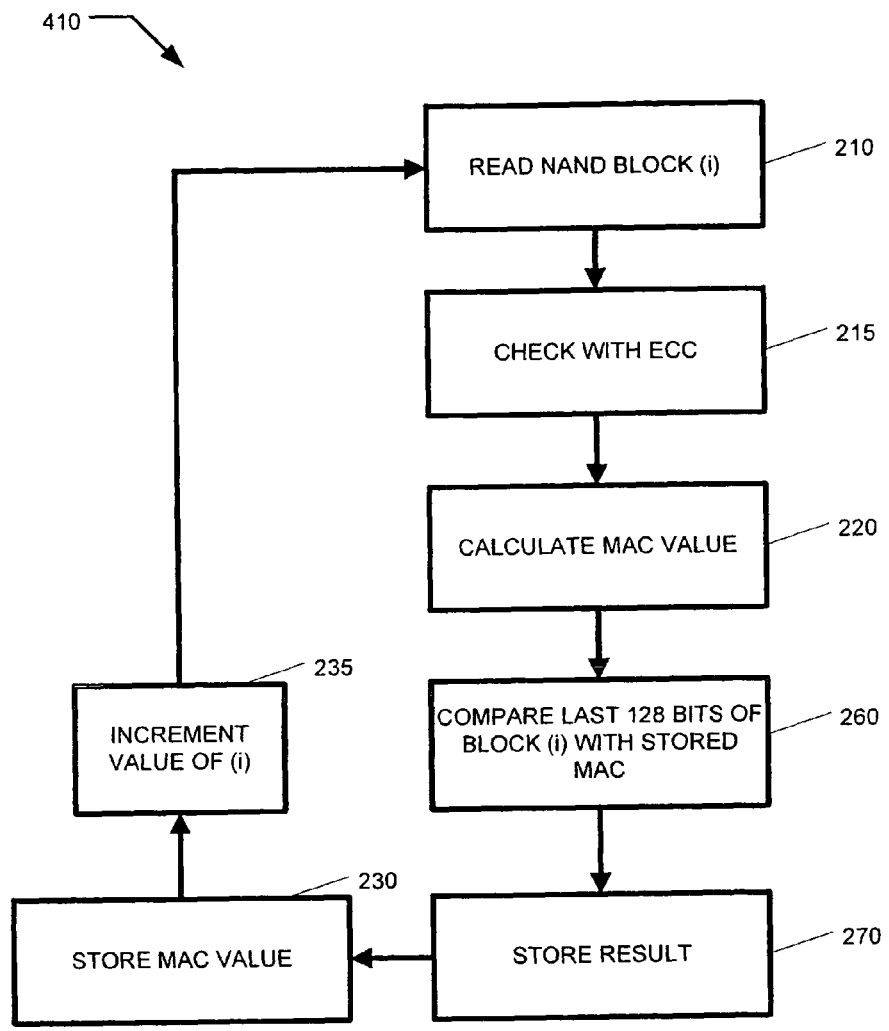
FIG. 5 is a flowchart of the integrity verification process 410 of FIG. 4.

In step 410, the system checks the integrity of the BLR, again according to the process seen in detail in the flowchart of FIG. 5. This is done, as the BLR passes through crypto engine 40, in the same way other data from flash memory 20 is verified (while the system is in integrity check mode). In step 420 the system checks the result of the integrity check performed in step 410. This is done by checking the results (flags or other indicators) stored in step 270 of the integrity check of process 200 seen in FIG. 5, which indicates whether there is a problem or not. If the BLR is not OK, the system will wait for a host command as seen in step 430 to send the system into a failure analysis state known as the return merchandise authorization (RMA) state. For more detail on this and other operating states or modes, please refer to a co-pending U.S. patent application Ser. No. 11/053,273 entitled "SECURE MEMORY CARD WITH LIFE CYCLE PHASES" to Holtzman et al., which is hereby incorporated by this reference in its entirety. If, however the BLR is OK, the system will execute the BLR in step 440. When booting is finished, the system will leave the integrity check mode based upon instructions contained in the BLR itself, as seen in step 440 of FIG. 4. The BLR comprises numerous instructions or "steps." Among them are step 440a, where the BLR reconfigures the crypto engine 40 to normal mode, or in other words takes the crypto engine 40 out of the integrity check mode. The BLR also contains instructions, as represented by step 440b, that cause the system to check the integrity of system firmware 200b.

FIG. 5 is a flow chart of integrity verification process 410, as discussed with regard to FIG. 4. It illustrates the general process of reading and hashing data that is stored in flash memory 20 when the system is in integrity check mode. While the reading of NAND type flash memory will be described for exemplary purposes, the present invention can be used with any type of memory or media used for mass storage purposes. Again, while the use of MAC values is illustrated and described, other hash values may also be used. The table of FIG. 2B will generally include the corresponding start byte and number of bytes for each entry (not shown). Generally speaking, the overall process, in the preferred embodiment, is used to verify the integrity of the NAND on a page by page basis. The process will verify the integrity of any data stored in the NAND. When the data happens to be the firmware, the firmware integrity is verified. While this page by page comparison is preferred, a smaller or larger unit of comparison may be made.

The integrity verification process in a preferred embodiment utilizes a unique calculation and control loop as shown in FIG. 5. The loop involves a continuous calculation and comparison operation. Typically in verification schemes, some type of "correct" or expected value is pre-stored and compared with a calculated value. In a preferred embodiment having the process shown in FIG. 5, the "correct" or expected value is stored within the "data under test" itself. Specifically, in the preferred embodiments described, it is in the last 128 bits of the data blocks. The last 128 bits of the sector being read will, for practical purposes, only correspond to the stored MAC (or other hash value) once, when the correct sector is read. The very small probability that a (false positive) match will occur on a page other than the last can be discounted for practical purposes.

In step 210, NAND block (i) is read. Next in step 215, the block is checked and optionally corrected if necessary with ECC circuitry. ECC is well known and can be used to correct physical errors in the data. While the use of ECC in conjunction with the integrity verification process is preferable, it is not essential, and the integrity is verified with or without the inclusion of step 215. It step 220 the hash value, preferably the MAC value in a preferred embodiment, is calculated. Although the MAC for block (i) is calculated, in integrity verification process 410, the resulting MAC covers blocks 0 to (i) and can be expressed mathematically as:

$$MAC[0\ldots(i)]=MAC[MAC[0\ldots(i-1)],block(i)].$$

After calculating in step 220, a comparison is performed in step 260. In step 260, the hardware of the controller, FWIC 31 in particular, compares the last 128 bits of block (i) with the previously stored MAC, that is, the MAC $[0\ldots(i-1)]$. In step 270, the result of the comparison is stored in a memory of the system. The first time the comparison of step 260 is performed, the "stored" value in the MAC register will not actually be an appropriate stored MAC value, but will be whatever value happens to be in the register, and can therefore be thought of as random. The result of the comparison will then be stored in step 270. For the first block, the comparison will not be checked. In step 230, the MAC value calculated in step 220 will be stored in a register of the controller, preferably in a register of FWIC 31. Next in step 235, a counter will be incremented so that the value of (i) is incremented by one and the next block will again be read in step 210. The loop will continue until all blocks (i) are read. When the last block is read, and thus processed by the encryption engine, if the last 128 bits match the MAC stored in step 230, the comparison will yield a match and the result stored in step 270 will reflect that the integrity has been verified by the hardware. Only when the last page of the BLR has been read will a match be used to indicate that the integrity has been verified. All previous matches (false true values) will be ignored. If the values are different this would indicate that there is a problem with the integrity of the data. Conversely, if the values are the same then the integrity of the data is assured.

After a match has occurred, the MAC value will again be updated in step 230, but this is a redundant operation of the loop that has no effect. This continuous calculation process allows the hardware to verify undefined content size. In other words, the MAC values can be properly calculated and the integrity verified by the hardware without having to first ascertain the number of blocks or the size of the file comprised by the blocks.

The process described above is used in certain operating states or modes, in particular the integrity check mode, for any data resident in the flash memory 20 of the memory card. In a preferred embodiment of a memory card according to the present invention, some of that data is firmware that runs the memory card when executed. In particular, at power up of system 10, when the system is in its regular operating state or test state, crypto engine 40 initializes itself (by starting in integrity check mode) to verify the integrity of any incoming data. When the data happens to be the firmware, the integrity of the firmware is verified as it passes through BMU 14 and in particular crypto engine 40. The stored result (not the integrity itself) can be checked by software, which in one embodiment involves instructions in the code stored in ROM 13. It should be noted that although the code stored in ROM 13 checks the result, and may initiate the flow of data, it is not involved in verifying the integrity of the firmware in the flash memory. In other words, the code is not responsible for performing any numerical calculations or data manipulation of the firmware in order to verify it. It is the hardware of the controller 12 or BMU 14, FWIC 31, and crypto engine 40 that verifies the integrity of the firmware, including the boot loader (BLR) portion and in some embodiments other portions of the firmware.

The process described in FIG. 5 involves both the hardware (HW) and the firmware (FW). As was mentioned, the hardware carries out the integrity check, while the firmware simply checks the flag set at the end of the HW integrity check. The HW and SW functions or "loops" are shown in more detail in FIGS. 6 and 7 respectively.

Figure 6:
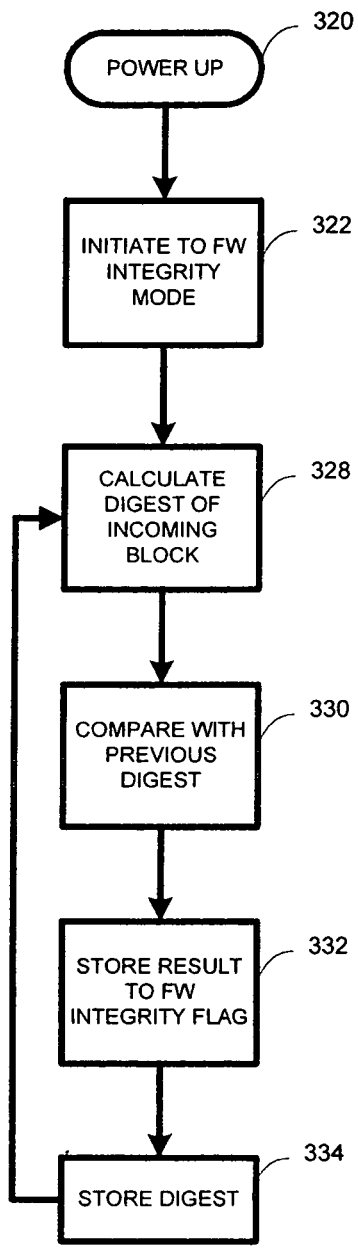
FIG. 6 is a flowchart of the hardware loop during booting.

Referring to FIG. 6 the system is powered up in step 320. In step 322 the controller hardware initiates FW integrity mode. This comprises two central activities. The first is activating FWIC 31 of FIG. 1. FWIC 31 once activated will orchestrate the remaining steps of FIG. 6 and thereby check the integrity of the BLR portion of the firmware, together with crypto engine 40. The second activity involves selecting a cryptographic algorithm for use by crypto engine 40. As mentioned previously, the hardware of crypto engine 40 is configured to encrypt and decrypt data with various different algorithms.

In step 328 the controller hardware calculates the digest of the incoming block. This calculation is performed by crypto engine 40. Next, in step 330 the digest calculated in step 328 is compared with the value of the previous digest. As discussed earlier, the register that holds the value will be checked and compared in every iteration of the loop, but on the first iteration, the value in the register will be random. A flag indicative of the integrity is then set in step 332. It is this flag that will be checked by the firmware of the system, in order to confirm that the HW has verified the integrity of the BLR portion of the firmware.

Figure 7:
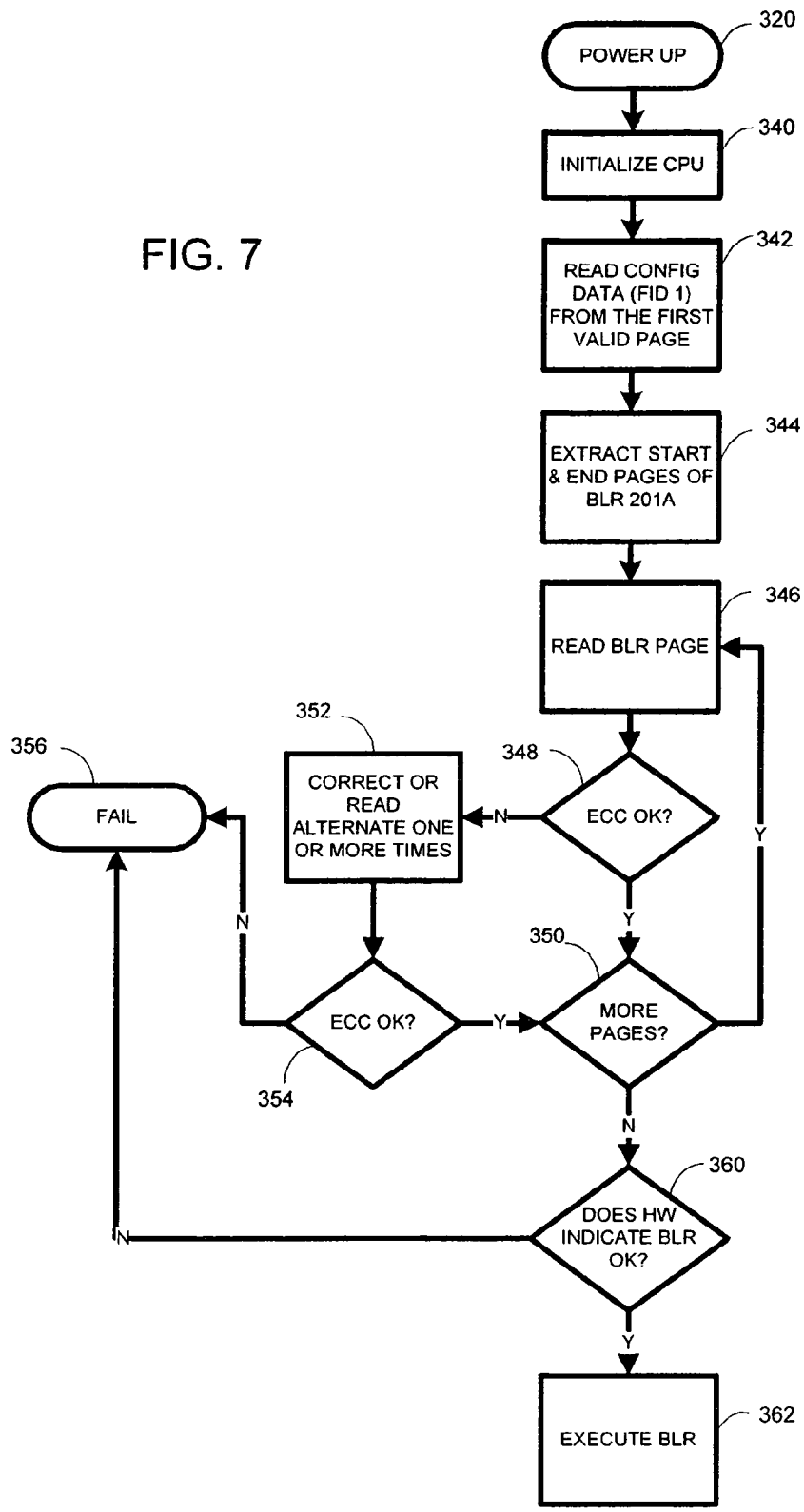
FIG. 7 is a flowchart of the firmware loop during booting.

FIG. 7 illustrates the firmware loop taking place while the HW checks the integrity in FIG. 6. In step 340 the CPU is initialized, after the system is powered up in step 320. The configuration data (which in a preferred embodiment is FID 1 of FIG. 3) is then read from the first valid page in step 342. Next, in step 344 the system extracts the start and end pages of the BLR 201A. Once this is known, all of the BLR pages are read. As each page is read error correction codes (ECC's) are generated. As mentioned previously, ECC circuitry operation is well known and can be used to correct physical errors in the data, up to a certain limit. While the use of ECC in conjunction with the integrity verification process is preferable, it is not essential, and the integrity is verified with or without use of ECC. After a page is read it is checked with the ECC circuitry in step 348 and, if it is not OK the page will be corrected with ECC correction mechanisms or an alternate page will be retrieved in step 352. If it is determined that the corrected or new page is OK in step 354 then the system will check to see if there are more pages to be read in step 350. If this is the case, then the system will return to step 346 and read another page. If step 354 indicates that the corrected or alternate copy is not OK in step 354 a failure condition will be indicated in step 356. If there are no more pages as determined in step 350, and a failure is not indicated, the system will check the integrity flag (that was set by the hardware as seen in FIG. 6) in step 360. If the flag indicates the BLR is OK in step 360, as was verified by the HW, the BLR will be executed in step 362. This execution is the same as that depicted in step 440 of FIG. 4.

While this integrity check is performed for only a portion of the firmware, namely the BLR, it should be understood that all of the firmware could also be checked this way, and that this explanation relates to a preferred embodiment that employs firmware bootstrapping. Additionally, the term memory card, as used in this application, is meant to also encompass the form factor of a USB flash drive.

Although the various aspects of the present invention have been described with respect to exemplary embodiments thereof, it will be understood that the present invention is entitled to protection within the full scope of the appended claims.

It is claimed:

1. A memory card comprising:
   flash memory;
   a controller having encryption hardware;
   random access memory; and
   firmware stored in the flash memory that controls writing data to and reading data from the flash memory and comprises a boot-loader portion and a main portion, wherein the boot loader portion, when executed, loads the main portion to the random access memory;
   wherein the integrity of the boot-loader portion is verified by comparing a value stored in the memory card with an encryption value calculated from the boot-loader portion by the controller encryption hardware as the boot-loader portion is uploaded to the random access memory when the memory card is powered up.

2. The memory card of claim 1 wherein the memory card further comprises instructions for checking a flag at the end of an initial booting process indicating that the boot-loader portion integrity has been verified.

3. The memory card of claim 1 wherein the integrity of the boot-loader portion is verified with hash values calculated as the boot-loader portion is uploaded to the random access memory.

4. The memory card of claim 1 wherein verifying the integrity of the boot-loader portion comprises utilizing MAC values for the boot-loader portion.

5. The memory card of claim 1 wherein the flash memory comprises memory cells of the NAND variety, and wherein an intermediate MAC value is calculated for a group of NAND pages.

6. The memory card of claim 5 wherein verifying the integrity further comprises comparing the MAC value for the group of pages with a MAC value stored in another page or group of pages.

7. The memory card of claim 1 wherein the controller comprises a firmware integrity circuit that manages the integrity check of the boot-loader portion.

8. The memory card of claim 1 wherein verifying the integrity of the boot-loader portion comprises utilizing SHA-1 values for the boot-loader portion.

9. A mass storage device comprising:
   flash memory;
   random access memory;
   a set of instructions that control data storage and retrieval operations of the mass storage device, the set of instructions stored in the flash memory and comprises a boot-loader portion and a main portion, wherein the boot loader portion, when executed, loads the main portion to the random access memory; and
   an encryption engine implemented in hardware circuitry of the mass storage device, the encryption engine encrypting and decrypting data stored in and read from the flash memory,
   the encryption engine operable to verify the integrity of the boot-loader portion when the mass storage device is powered up, wherein the integrity of the boot-loader portion is verified by comparing a value stored in the mass storage device with an encryption value calculated by the encryption engine.

10. The mass storage device of claim 9 wherein the boot-loader portion does not comprise instructions that verify the integrity of at least a portion of the instructions.

11. The mass storage device of claim 9 wherein the boot-loader portion comprises instructions for checking the status of an indicator, the indicator indicating whether or not the integrity of the boot-loader portion has been verified.

12. A memory card comprising:
   a non-transitory mass storage medium comprising flash memory;
   random access memory;
   firmware residing in the non-transitory mass storage medium and comprising a boot-loader portion and a main portion, wherein the boot loader portion, when executed, loads the main portion to the random access memory; and
   a hardware implemented cryptographic engine, wherein the cryptographic engine is used to verify the integrity of the boot-loader portion when the memory card is powered up, wherein the integrity of the boot-loader portion is verified by comparing a value stored in the memory card with an encryption value calculated by the cryptographic engine.

13. The memory card of claim 12 further comprising code, wherein the code comprises instructions to load the boot loader portion of the firmware into the random access memory.

14. The memory card of claim 13 wherein the code comprises instructions to check a hardware flag indicative of the integrity of the boot loader portion that was verified using the cryptographic engine.

* * * * *